(12) United States Patent
Li

(10) Patent No.: US 6,687,441 B1
(45) Date of Patent: Feb. 3, 2004

(54) LARGE EFFECTIVE AREA WAVEGUIDE FIBER

(75) Inventor: Ming-jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/936,393

(22) PCT Filed: Mar. 7, 2000

(86) PCT No.: PCT/US00/05948

§ 371 (c)(1),
(2), (4) Date: Sep. 10, 2001

(87) PCT Pub. No.: WO00/55661

PCT Pub. Date: Sep. 21, 2000

Related U.S. Application Data

(60) Provisional application No. 60/123,862, filed on Mar. 12, 1999.

(51) Int. Cl.[7] .................................................. G02B 6/02
(52) U.S. Cl. ........................ 385/123; 385/124; 385/125
(58) Field of Search ................................. 385/123–125, 385/141, 142

(56) References Cited

U.S. PATENT DOCUMENTS

| 3,973,828 A |   | 8/1976  | Onoda et al. ................. 350/96 |
| 5,471,553 A | * | 11/1995 | Teshima ....................... 385/125 |
| 5,675,690 A |   | 10/1997 | Nouchi et al. ............... 385/127 |
| 5,802,236 A | * | 9/1998  | DiGiovanni et al. ........ 385/127 |
| 5,815,627 A |   | 9/1998  | Harrington ................... 385/125 |
| 6,418,258 B1 | * | 7/2002 | Wang ........................... 385/125 |
| 6,532,331 B1 | * | 3/2003 | Kato et al. ................... 385/123 |

FOREIGN PATENT DOCUMENTS

| DE | 0 859 247 | 8/1998 | ............ G02B/6/00 |
| GB | 0 789 255 | 8/1997 | ............ G02B/6/16 |

OTHER PUBLICATIONS

P. Nouchi et al., New Dispersion Shifted Fiber With Effective Area Larger Than 90 um$^2$, 22$^{nd}$ European Conference on Optical Communications, 1996, Oslo, 1.49–1.52.

* cited by examiner

*Primary Examiner*—John D. Lee
*Assistant Examiner*—Jennifer Doan
(74) *Attorney, Agent, or Firm*—William J. Chervenak; Joseph M. Homa

(57) ABSTRACT

Disclosed is a single mode optical waveguide fiber having a segmented core in which the central segment is a void. The shape and radial extent of the core segments are selected to provide a low dispersion slope together with large effective area and good bend resistance. Embodiments of the refractive index profiles in accord with the invention are shown having two or three annular segments surrounding the central void. The presence of the void provides the benefits of a negative relative index located centrally in the core region without the process difficulties associated with the use of dopants that decrease the refractive index of the waveguide fiber.

24 Claims, 7 Drawing Sheets

LARGE EFFECTIVE AREA WAVEGUIDE FIBER

This application claims the benefit of U.S. Provisional Patent Application No. 60/123,862, filed Mar. 12, 1999.

BACKGROUND OF THE INVENTION

1. Field of the Invention

The present invention is directed to an optical waveguide fiber having a segmented core design. In particular, the core is designed to provide a fiber that reduces non-linear effects while maintaining a standard resistance to bend.

2. Technical Background

A waveguide having large effective area reduces non-linear optical effects, including self phase modulation, four wave mixing, cross phase modulation, and non-linear scattering processes, all of which can cause degradation of signals in high power systems. In general, a mathematical description of these non-linear effects includes the ratio, $P/A_{eff}$, where P is optical power. For example, a non-linear optical effect may be characterized by an equation containing a term, $\exp[P \times L_{eff}/A_{eff}]$, where $L_{eff}$ is effective length. Thus, an increase in $A_{eff}$ produces a decrease in the non-linear contribution to the degradation of a light signal. The benefit of large $A_{eff}$ can also be illustrated using the equation for refractive index that includes the non-linear refractive index. The refractive index of silica based optical waveguide fiber is known to be non-linear with respect to the light electric field. Refractive index may be expressed as, $$n = n_0 + n_2\, P/A_{eff},$$

where $n_0$ is the linear refractive index, $n_2$ is the non-linear index coefficient, P is light power transmitted along the waveguide and $A_{eff}$ is the effective area of the waveguide fiber. Because $n_2$ is nearly a constant of the material, increasing $A_{eff}$ is an effective means for reducing the non-linear contribution to the refractive index, thereby reducing the impact of Kerr type non-linearities.

The need in the telecommunication industry for greater information capacity over long distances, without electronic regeneration, continues to encourage investigation of waveguide fiber refractive index profiles that provide enhanced operating properties with regard to non-linear effects and wavelength division multiplexing. In systems that make use of wavelength division multiplexing, a fiber having low dispersion slope is preferred. At the same time, such properties as, attenuation, bend resistance, and fiber strength are expected to be comparable to those of existing waveguide fiber.

One focus of this investigation has been the search for less complex index profile designs that provide the desired performance parameters, but still are reasonably compatibility with a fiber manufacturing environment, so that costs may be controlled.

The present invention is directed to a core refractive index profile species, of the segmented core genus, that reduces non-linear effects and which is particularly suited to transmission of high power, multiplexed signals over long distances without regeneration. The definition of high power and long distance is most meaningful in the context of a particular telecommunication system wherein a bit rate, a bit error rate, a multiplexing scheme, and perhaps optical amplifiers are specified. There are additional factors, known to those skilled in the art, which have impact upon the meaning of high power and long distance. However, for most purposes, high power is an optical power greater than about 10 mW. For example, a long distance is one in which the distance between electronic regenerators can be in excess of 100 km.

There is a continuing need for an optical waveguide fiber designed to have the properties similar to those of standard step index fiber or standard dispersion shifted fiber with the additional properties of relatively large effective area and low dispersion slope. The window of operation of greatest interest at this time is that near 1550 nm. The fiber of this invention can be designed to operate over this window, which may extend from, for example, about 1400 nm to 1700 nm.

DEFINITIONS

The following definitions are in accord with common usage in the art. The radii of the segments of the core are defined in terms of the index of refraction of the segment material. A particular segment has a first and a last refractive index point. A central segment has an inner radius of zero because the first point of the segment is on the centerline. The outer radius of the central segment is the radius drawn from the waveguide centerline to the last point of the refractive index of the central segment. For a segment having a first point away from the centerline, the radius from the waveguide centerline to the location of this first refractive index point is the inner radius of that segment. Likewise, the radius from the waveguide centerline to the location of the last refractive index point of the segment is the outer radius of that segment.

The segment radius may be conveniently defined in a number of ways. In this application radii are defined in accord with FIG. 1, described in detail below.

The definitions of segment radius and refractive index used to describe refractive index profile in no way limit the invention. Definitions are given herein because in carrying out model calculations, the definitions must be used consistently. The model calculations set forth in the table below are made using the geometrical definitions illustrated in FIG. 1.

The effective area is generally defined as, $$A_{eff} = 2\pi (\int E^2 r\, dr)^2 / (\int E^4 r\, dr),$$

where the integration limits are 0 to ∞, and E is the electric field associated with the propagated light. An effective diameter, $D_{eff}$, may be defined as, $$A_{eff} = \pi (D_{eff}/2)^2.$$

The relative index of a segment, $\Delta\%$, as used herein, is defined by the equation, $$\Delta\% = 100 \times (n_i - n_c)/n_{c1}$$

where $n_i$ is the maximum refractive index of the index profile segment denoted as i, and $n_c$, the reference refractive index, is taken to be the minimum index of the clad layer. Every point in a segment has an associated relative index. The maximum relative index is used to conveniently characterize a segment whose general shape is known.

The term refractive index profile or simply index profile is the relation between $\Delta\%$ or refractive index and radius over a selected segment of the core. The term alpha profile refers to a refractive index profile that may be expressed by the equation, $$n(r) = n_0(1 - \Delta[r/a]^\alpha),$$

where r is core radius, $\Delta$ is defined above, a is the last point in the profile segment, the value of r at the first point of the $\alpha$-profile is chosen in accord with the location of the first point of the profile segment, and $\alpha$ is an exponent which defines the profile shape. Other index profiles include a step index, a trapezoidal index and a rounded step index, in which the rounding is usually due to dopant diffusion in regions of rapid refractive index change.

Total dispersion is defined as the algebraic sum of waveguide dispersion and material dispersion. Total dispersion is sometimes called chromatic dispersion in the art. The units of total dispersion are ps/nm-km.

The bend resistance of a waveguide fiber is expressed as induced attenuation under prescribed test conditions. A bend test referenced herein is the pin array bend test that is used to compare relative resistance of waveguide fiber to bending. To perform this test, attenuation loss is measured for a waveguide fiber with essentially no induced bending loss. The waveguide fiber is then woven in a serpentine path through the pin array and attenuation again measured. The loss induced by bending is the difference between the two measured attenuation values. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the serpentine woven waveguide fiber conform to the portions of the pin surface at which there is contact between fiber and pin.

Another bend test referenced herein is the lateral load test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

SUMMARY

A first aspect of the invention is a single mode optical waveguide fiber having a segmented core region. The core has a central segment and at least one annular segment surrounding the central segment. Each segment is defined in terms of its radii and $\Delta\%$. The central segment is a void that therefore has a refractive index of about 1 over its radius. The relative index of the void is negative because the reference index has been chosen to be silica. A feature of the invention is that the central segment has a large negative relative index without the usual process complications that result from down doping a glass.

The radii and relative indexes of the segments are selected to provide an effective area greater than about 70 $\mu m^2$ and a dispersion slope less than about 0.08 ps/nm-km. In addition, the induced attenuation under lateral load, as defined above, is less than about 0.8 dB/m.

An embodiment of the waveguide fiber is characterized by a zero dispersion wavelength in the range of about 1450 nm to 1650 nm.

Another embodiment is characterized by a radius of the central void in the range of about 0 to 3 $\mu m$.

Yet a further embodiment includes, in addition to the central void, three annular segments that surround the central void. The annular segments are layered one upon another. The central segment and the three annular segments have respective relative indexes, $\Delta_1\% > \Delta_3\% > \Delta_2\% > \Delta_0\%$, where the segment numbering is consecutive beginning with 0 for the central segment.

A further embodiment has a second annular segment for which the relative index $\Delta_2\%$ is negative.

The index profile shapes of each respective annular segment can have a shape that is a step, and $\alpha$-profile, a rounded step, or a trapezoid in any permutation or combination.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of a refractive index profile in accordance with the present invention is shown in FIG. 1.

Figure 1:
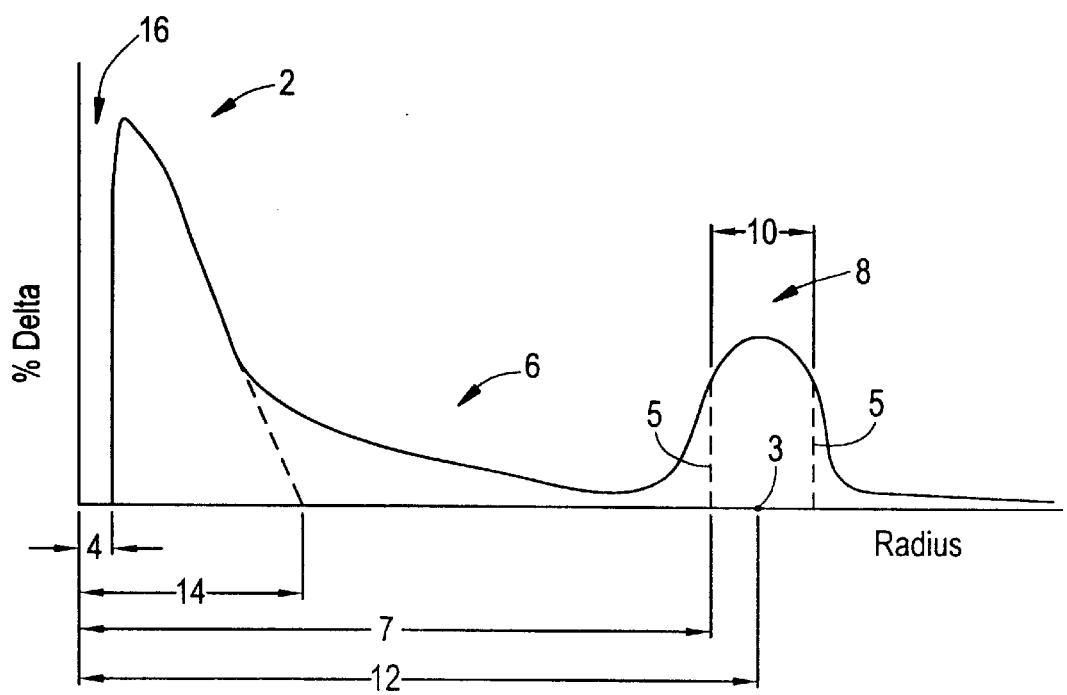
FIG. 1 is a general segmented core refractive index profile that shows the definitions of radius used in this specification.

In the exemplary refractive index profile of FIG. 1, the core segments are indicated as 16 (the void), 2, 6, and 8. Segments 2, 6, and 8 have a shape depending upon $\Delta\%$ versus radial position.

As illustration of the definitions of segment radius given above, the radius of central void 16 is shown as length 4, the distance from the centerline to the first point at which the relative index is zero. This first point will also be understood to be the intersection of the first annular segment profile with the horizontal axis. The radius of the central void is also the inner radius of the first annular segment.

The first annular segment 2 is delimited by the radius 4 and the radius 14. The radius 14 extends from the fiber centerline to the intersection with the horizontal axis of the line formed by extrapolating the descending portion of the first segment refractive index profile. The second annular segment has an outer radius given by radius 7, the distance from the fiber centerline to the radial point at which the relative index is half the maximum $\Delta\%$ of the third segment. (Recall that the $\Delta\%$ of a segment is defined as the $\Delta\%$ calculated using the peak refractive index of the segment.) Because the third annular segment 8 is the last annular segment in this illustrative core index profile, the characteristic radius of the segment 8 is radius 12, which extends from the fiber centerline to the midpoint of the base of segment 8, as indicated by point 3. This convention for final annular radius is used for all refractive index profiles described herein. A convenient measure of a profile segment is the width 10 shown between vertical lines 5. Lines 5 depend from the half-maximum % delta index points of the segment. This convention for annular width is used for all final profile segments of profiles disclosed and described herein.

Figure 2:
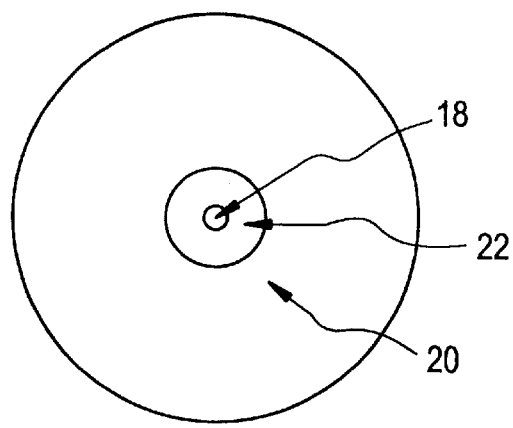
FIG. 2 is a cross section illustration of an embodiment of the fiber of the invention.

In the cross sectional view of an exemplary fiber, FIG. 2, void 18, a main feature of the refractive index profile, extends substantially the full length of the waveguide fiber. The void is surrounded by annular core segment 22, which in turn is surrounded by clad 20. The core region may include additional annular segments, not shown.

Figure 3:
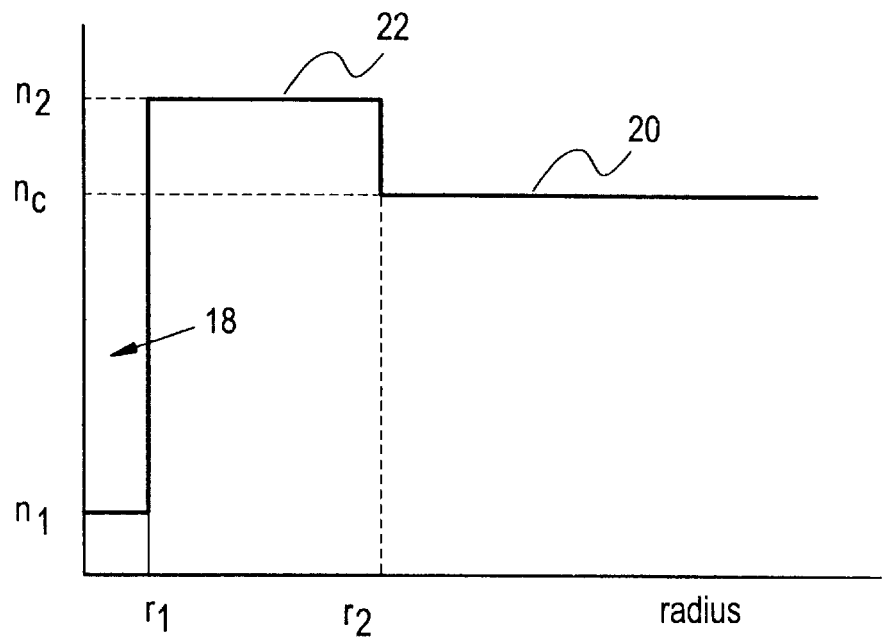
FIG. 3 illustrates the definition of relative refractive index, $\Delta$, for an embodiment of the refractive index profile of the invention.

An embodiment of a refractive index profile that corresponds to the cross section view of FIG. 2 is illustrated in FIG. 3. The central void 18 has refractive index $n_0$. The step shaped annular segment 22 has refractive index $n_1$ and the clad layer has refractive index $n_c$. The relative index percent of annular segment 22 is, in accord with the definition given above, $\Delta_1\% = (n_1 - n_c)/n_c \times 100$.

Figure 4:
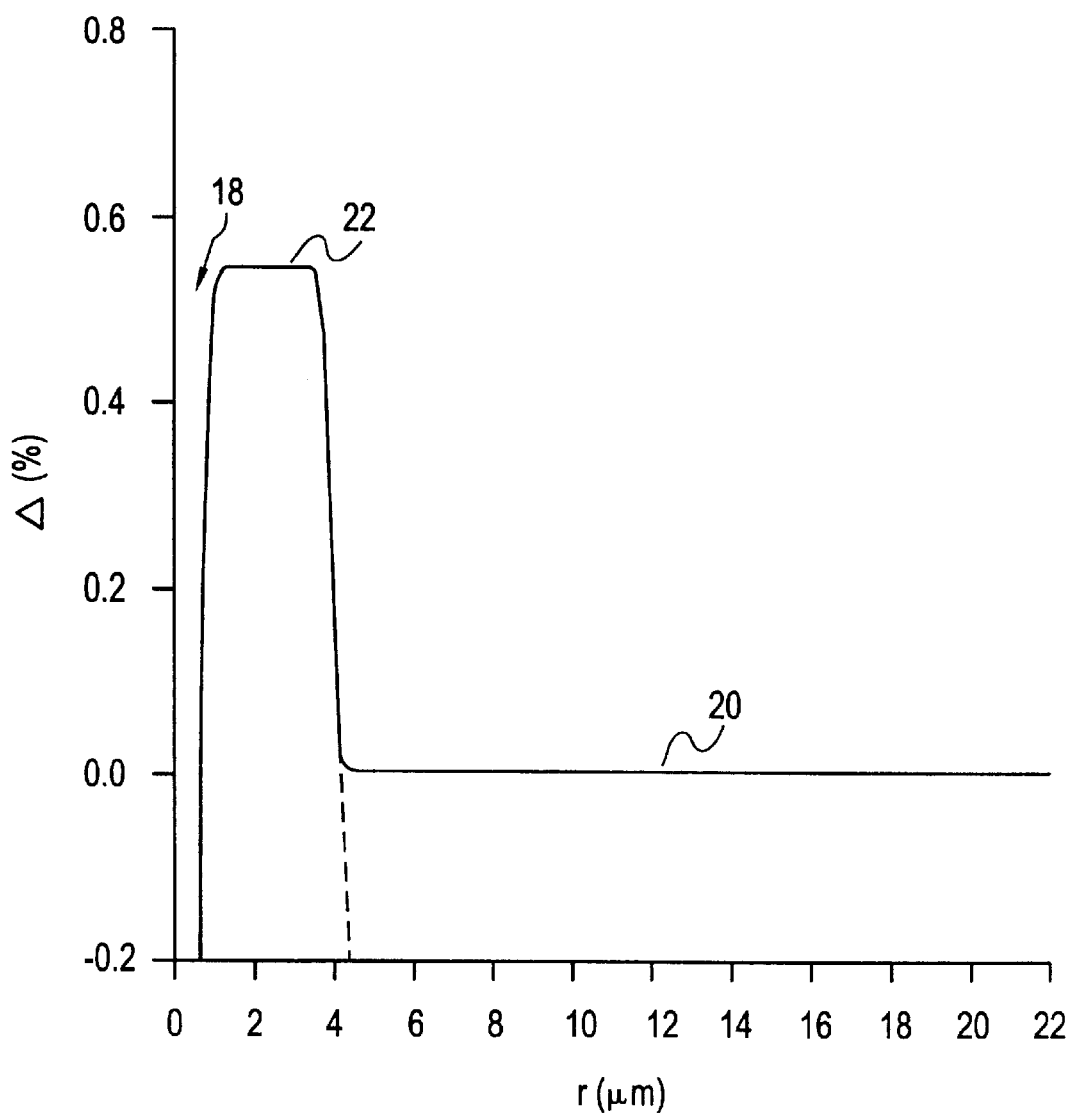
FIGS. 4, 5, 6, 7 and 8 are charts of relative refractive index versus fiber radius for exemplary embodiments of the invention.

A different embodiment of the refractive index profile is illustrated in FIG. 4. In this embodiment, the step shape 22 has rounded edges that can be due to diffusion of dopant material during the process of making the waveguide fiber preform. The gradations on the radius axis show that the radius of the void is about 1 µm and the outer radius of annular segment 22 is about 4.5 µm. In an embodiment in accord with FIG. 4, the central segment radius $r_0$ is in the range of about 0.05 µm to 3 µm. The central segment is surrounded by and in contact with an annular segment adjacent the central segment. This annular segment comprises a rounded step profile having a center radius $r_1$, measured from the centerline to the geometrical center of the annular segment, in the range of about 2 µm to 5 µm. The width of the annular core segment $w_1$ is measured at the half maximum relative index points of the annular segment, and is in the range of about 0.5 µm to 5.0 µm. Its relative index, $\Delta_1\%$, in the range of about 0.4% to 1.1%. An alternative embodiment in accord with FIG. 4 has the same void as just described and an annular segment shape that is an α-profile, α being about 1. The radius $r_1$ is in the range of about 4 µm to 8 µm and the relative index, $\Delta_1\%$, in the range of about 0.7% to 1.1%.

In another embodiment the radius of the central segment is again in the range of about 0.05 µm to 3 µm and the first annular segment is as described immediately above. This core region embodiment includes a second annular segment having a step index profile and a relative index, $\Delta_2\%$, in the range less than about 0.2%, and an outer radius, $r_2$, in the range of about 7 µm to 9 µm.

In yet another embodiment, the core region is segmented and has central segment and first annular segment radii and Δ's as described immediately above. This core region embodiment includes a third annular segment, see for example any one of FIGS. 5–8, surrounding and in contact with the second annular segment. The center radius of this third segment is in the range of about 7.5 µm to 10.5 µm. Its width is in the range of about 1.0 µm to 2.5 µm, and its relative index, $\Delta_3\%$, in the range of about 0.2% to 0.4%.

Another embodiment of the invention again has a central segment of outer radius in the range of about 0.05 µm to 3.0 µm. A first annular segment shape is an α-profile, α being about 1. The radius $r_1$ of this first annular region is in the range of about 4 µm to 8 µm and the relative index, $\Delta_1\%$, in the range of about 0.7% to 1.1%. The core further has a third segment of radius $r_2$ in the range of about 8 µm to 10 µm and a relative index $\Delta_2\%$ that is negative, as illustrated in segment 24 of FIG. 6. A preferred range for $\Delta_2\%$ is about 0 to 0.3%. This embodiment can include a third annular segment having a rounded step index profile and a center radius, $r_3$, in the range of about 9 µm to 11 µm, a width in the range of about 1.5 µm to 3 µm, and a relative index, $\Delta_3\%$, in the range of about 0.2% to 0.4%.

Another embodiment that provides desirable properties is one in which the core region has a central segment of radius $r_0$ in the range of about 0.05 µm to 3 µm, and an adjacent annular segment having an α-profile wherein α is about 1. The outside radius, $r_1$, in the range of about 4 µm to 6 µm and a relative index, $\Delta_1\%$, in the range of about 0.9% to 1.1%. A second annular segment has an outer radius, $r_2$, in the range of about 8 µm to 10 µm and a relative index, $\Delta_2\%$, in the range of about 0 to –0.3%. A third annular segment has a rounded step index profile and a center radius, $r_3$, in the range of about 9 µm to 11 µm, a width in the range of about 1.5 µm to 3 µm, and a relative index, $\Delta_3\%$, in the range of about 0.2% to 0.4%.

Yet another embodiment has a core region having a central segment of radius $r_0$ in the range of about 0.05 µm to 3 µm, and an adjacent annular segment having an α-profile, where α is about 1. This annular segment has an outside radius, $r_1$, in the range of about 4 µm to 6 µm and a relative index, $\Delta_1\%$, in the range of about 0.9% to 1.1%. A second annular segment may be added to this embodiment, the second annular segment having a step index profile and a relative index, $\Delta_2\%$, in the range of about 0 to 0.2%, and an outer radius, $r_2$, in the range of about 7 µm to 9 µm. Furthermore, a third annular segment may be added that has a rounded step profile and a center radius, $r_3$, in the range of about 7.5 µm to 9 µm, a width in the range of about 1.0 µm to 2.5 µm, and a relative index, $\Delta_3\%$, in the range of about 0.2% to 0.4%.

The relative index of the void is negative because the reference refractive index is that of the clad layer. The presence of the void provides the benefits of having a negative relative index for the central segment of the core without the processing difficulties encountered in using a glass for the central segment having an index decreased by a dopant such as fluorine. The properties of the index profile of FIG. 4 have been calculated and are set forth in Table 1, together with the calculated properties of the index profiles of FIGS. 5–8.

Figure 5:
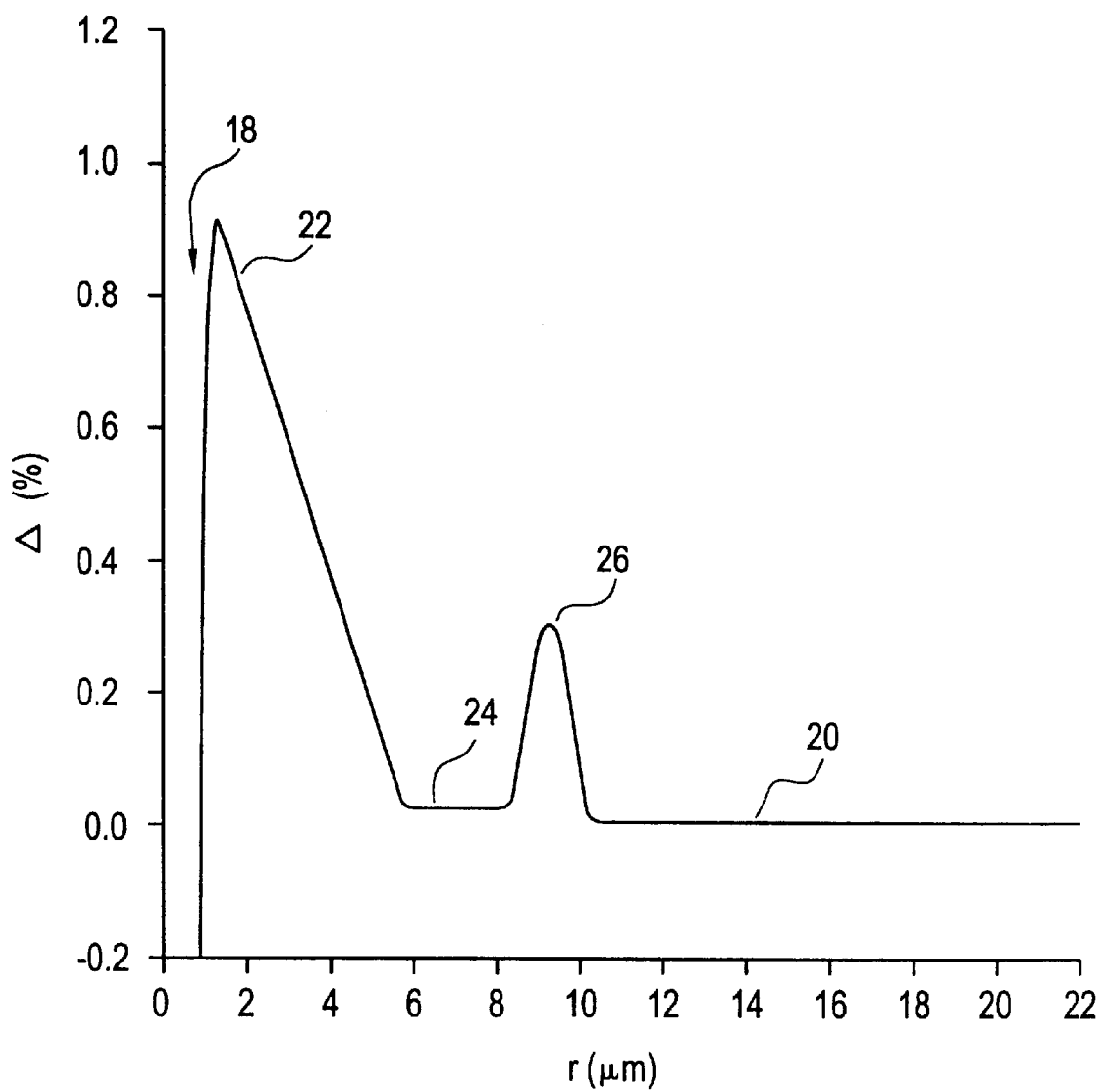

The embodiment of the index profile shown in FIG. 5 has a core region that includes three annular segments, 22, 24, and 26. The shape of first annular segment 22 is substantially a triangle having a first side essentially vertical and a second side that is an α-profile having α=1. The relative indexes and radii of the segments may be read from the axes of the index profile chart. The second annular core segment 24 is substantially flat and annular core segment 26 has a rounded triangular shape. All core segments except the central void 18 have positive relative indexes.

Figure 6:
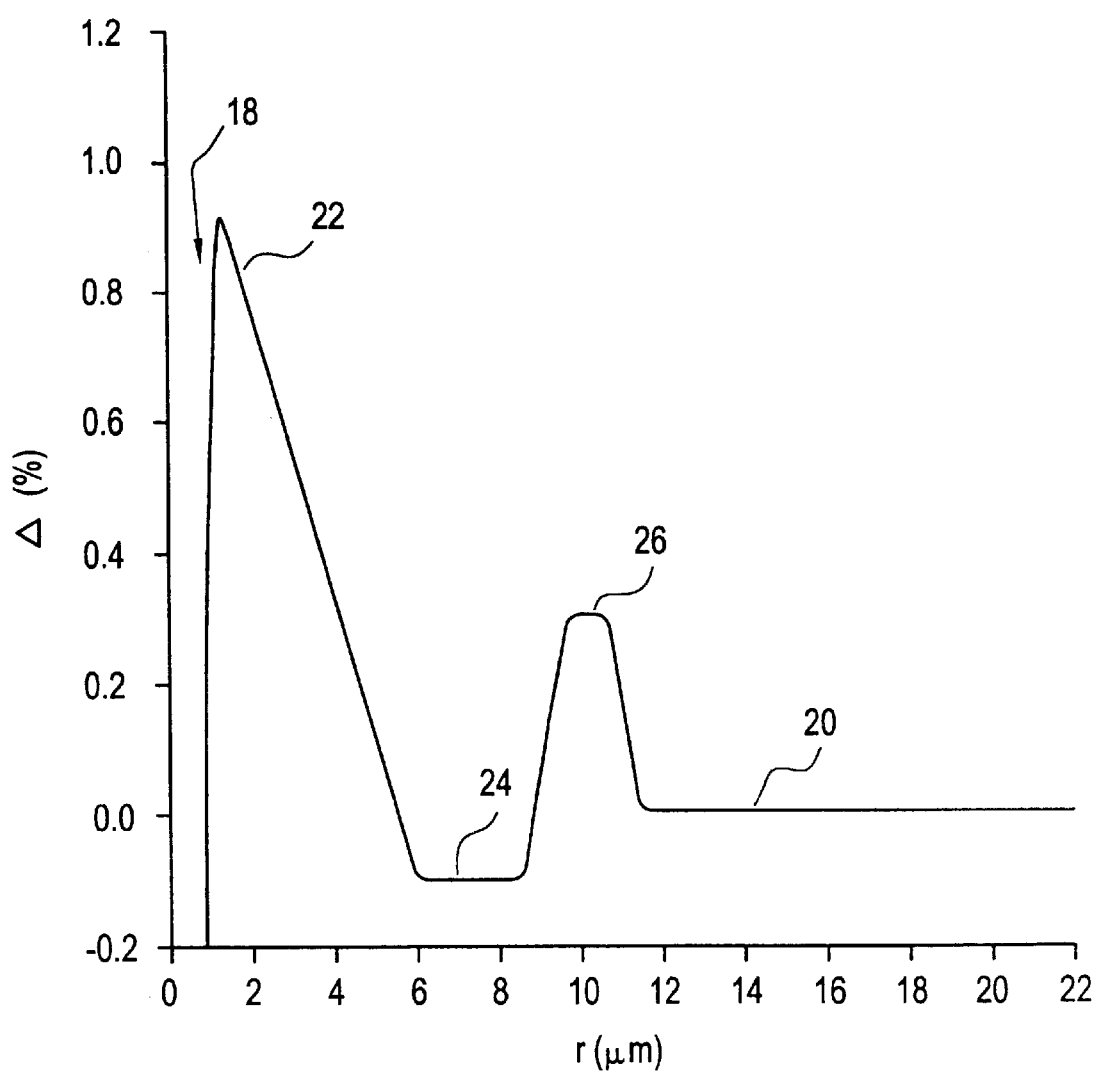

The embodiment of the refractive index profile shown in FIG. 6 has a second annular core segment 24 of negative relative index. The profile shape of the third annular core segment is a rounded step. Referring to Table 1 below, it is seen that this configuration provides the desired low dispersion slope, large effective area, and bend resistance.

Figure 7:
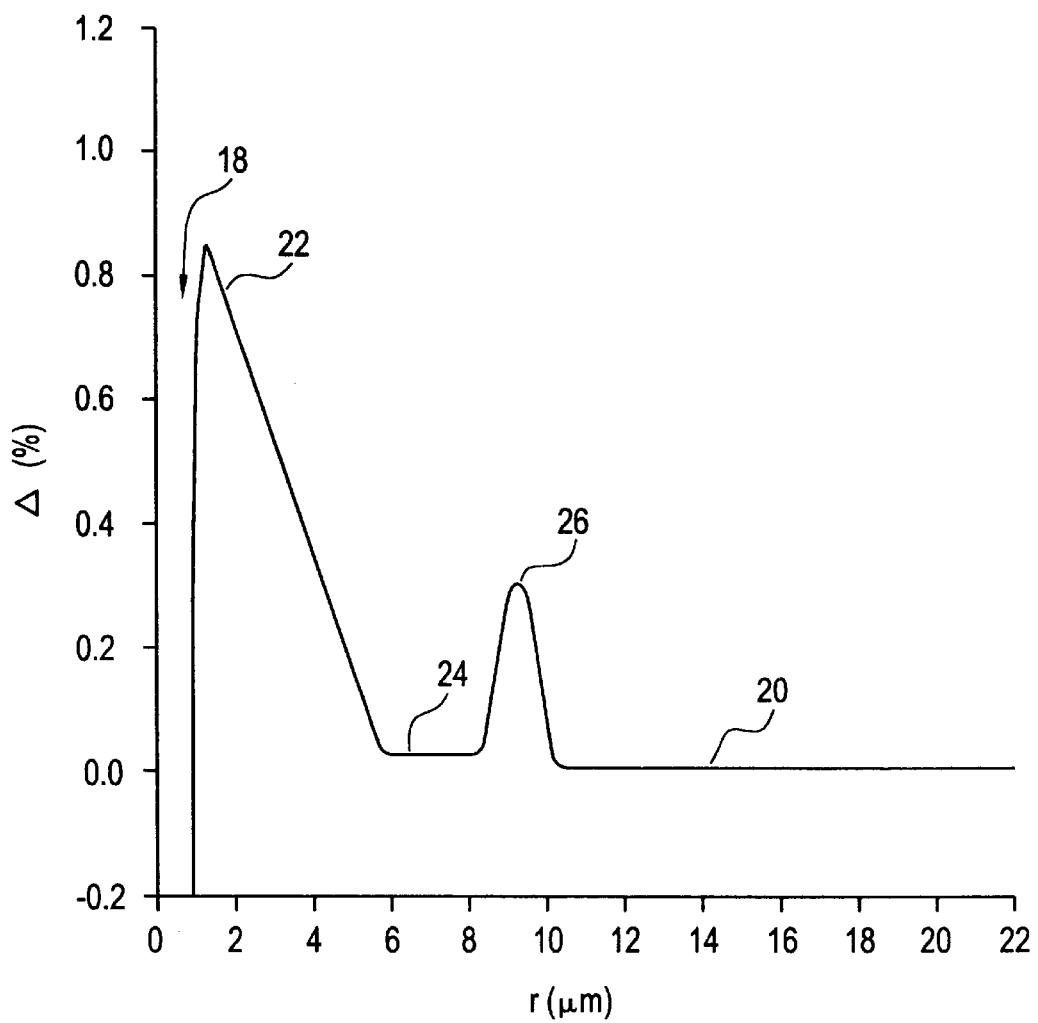

The embodiment of the refractive index profile shown in FIG. 7 is similar to that of FIG. 5 except that the relative index of first annular core segment 22 is comparatively lower in the FIG. 7 profile. The comparison of the optical performance of these two core designs provides one with some clarification of the role of the index peak of the first (innermost) annular segment. The sacrifice in performance due to lowering the peak relative index of the first annular segment appears to be induced bend loss. However, a reduced amount of dopant often provides lower Rayleigh scattering, i.e., a lower attenuation coefficient, which, in some telecommunications systems, may be of greater importance than bend resistance.

Figure 8:
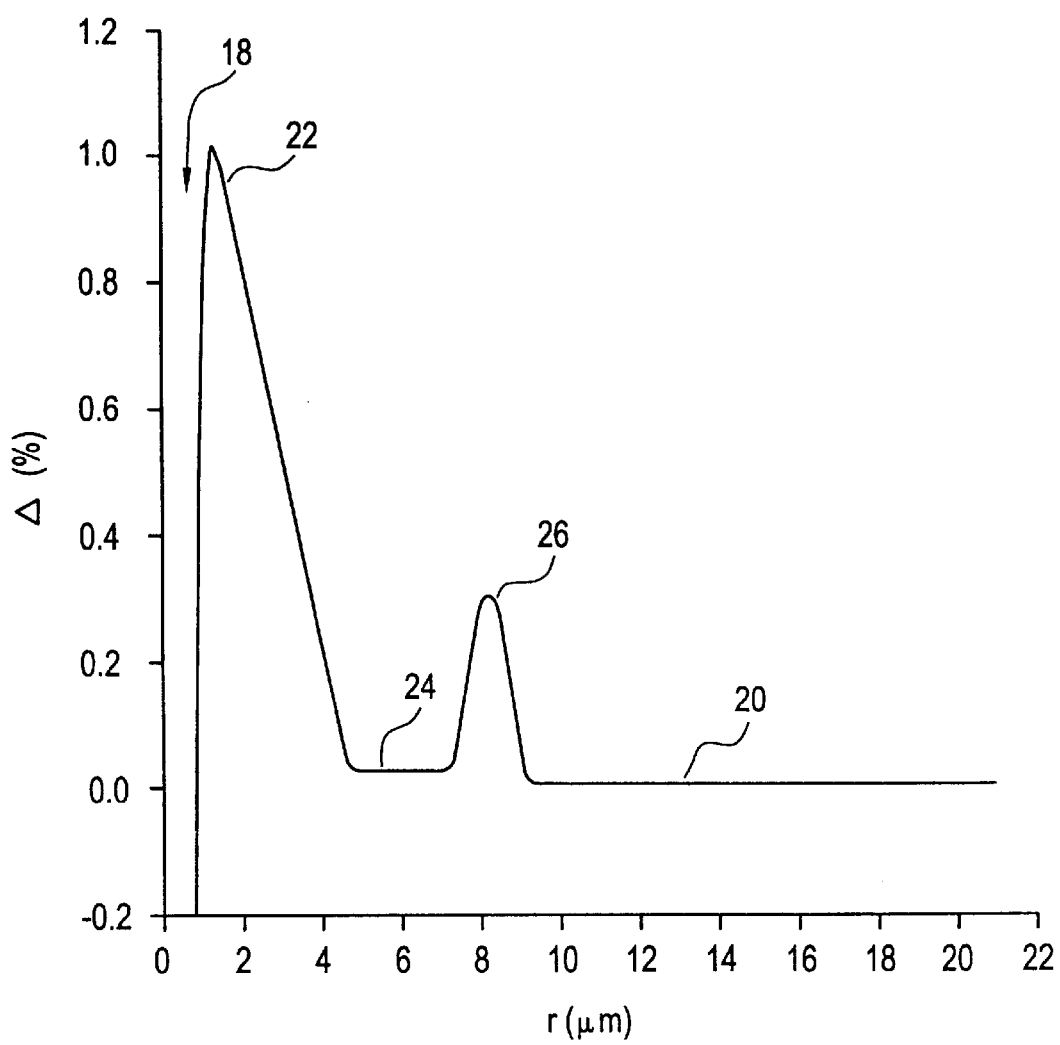

The embodiment set forth in FIG. 8 is similar to that of FIGS. 5 and 7 except that the peak relative index of the first annular core segment 22 is comparatively larger. Table 1 shows that bend performance is good in the FIG. 8 embodiment.

TABLE 1

| Profile | $\lambda_0$ (nm) | S (ps/km.nm2) | MFD ($\mu$m) | $\lambda_{cc}$ (nm) | $A_{eff}$ ($\mu$m$^2$) | PA (dB) | LL (dB/m) |
|---|---|---|---|---|---|---|---|
| FIG. 4 | 1472 | 0.0540 | 8.3 | 1043 | 101 | 21 | 0.503 |
| FIG. 5 | 1478 | 0.0602 | 8.0 | 1209 | 91 | 0.27 | 0.263 |
| FIG. 6 | 1498 | 0.0395 | 7.5 | 1035 | 90 | 3.4 | 0.232 |
| FIG. 7 | 1472 | 0.0623 | 8.4 | 1218 | 111 | 1.6 | 0.800 |
| FIG. 8 | 1579 | 0.0697 | 7.9 | 1184 | 82 | 1.3 | 0.246 |

The zero dispersion wavelength is $\lambda_0$; dispersion slope is S; mode field diameter is MFD; cabled cutoff wavelength is $\lambda_{cc}$; effective area is $A_{eff}$; pin array bending loss is PA; and lateral load bending loss is LL. A preferred wavelength range for telecommunications applications is about 1500 nm to 1600 nm. The dispersion slope S can be made essentially constant over such a wavelength range.

The optical performance of all the embodiments in Table 1 is satisfactory. The Table serves to indicate what profile modifications improve a particular parameter as well as what impact the modification may have on other parameters. The service environment of the waveguide fiber helps to determine the desirability of one profile choice, in accord with the invention, over another profile choice.

The invention includes embodiments that have more than three annular segments. Due to the increased difficulty of manufacture as the number of core segments increases, one preferably chooses a waveguide fiber core that has the desired optical properties and the fewest number of segments.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

I claim:

1. An optical waveguide fiber comprising:
   a core region having a centerline, a radius, and including a first annular segment surrounding the centerline, the first annular segment having an inner radius, radius $r_0$, defining a central void, the central void and the first annular segment each having a refractive index profile, a radius, and a relative index $\Delta\%$, and
   a clad glass layer, surrounding and in contact with the core region, having a refractive index profile and a minimum relative index $\Delta\%$ of zero;
   wherein the radii of said core region are selected so that the optical waveguide fiber is single mode.

2. The optical waveguide fiber of claim 1 in which the radii, the refractive index profiles, and the relative indexes of the core region are selected to provide an effective area greater than about 70 $\mu$m$^2$ at a wavelength of about 1550 nm.

3. The optical waveguide fiber of claim 2 in which the radii, the refractive index profiles, and the relative indexes of the core region are selected to provide a total dispersion slope less than about 0.08 ps/nm$^2$-km over a wavelength range of about 1500 nm to 1600 nm.

4. The optical waveguide fiber of claim 3 in which the radii, the refractive index profiles, and the relative indexes of the core region are selected to provide an induced attenuation under lateral load less than about 0.8 dB/m measured at about 1550 nm.

5. The optical waveguide fiber of claim 4 in which the radii, the refractive index profiles, and the relative indexes of the core region are selected to provide a zero dispersion wavelength in the range of about 1450 nm to 1650 nm.

6. The optical waveguide fiber of claim 4 in which the inner radius $r_0$ is in the range of about 0.05 $\mu$m to 3 $\mu$m, and the first annular segment comprises a rounded step profile having a center radius $r_1$, measured from the centerline to the geometrical center of the annular segment, in the range of about 2 $\mu$m to 5 $\mu$m, a width $w_1$, measured at the half maximum relative index points of the first annular segment, in the range of about 0.5 $\mu$m to 5.0 $\mu$m, and a relative index, $\Delta_1\%$, in the range of about 0.4% to 1.1%.

7. The optical waveguide fiber of claim 4 in which radius, $r_0$, is in the range of about 0.05 $\mu$m to 3 $\mu$m, and the first annular segment adjacent the central void has an $\alpha$-profile having an $\alpha$ of about 1, and an outer radius, $r_1$, in the range of about 4 $\mu$m to 8 $\mu$m and a relative index, $\Delta_1\%$, in the range of about 0.7% to 1.1%.

8. The optical waveguide fiber of claim 1 in which the radius $r_0$ is in the range of 0.05 $\mu$m to about 3 $\mu$m.

9. The optical waveguide fiber of claim 1 in which the core region further comprises second and third annular segments, and beginning at 0 and counting outward from the central void, the relative refractive indexes, $\Delta_i$, where i is 0, 1, 2, 3, of the central void and the first, second, and third annular segments are described by the relation, $\Delta_1 > \Delta_3 > \Delta_2 > \Delta_0$.

10. The optical waveguide fiber of claim 9 in which the relative refractive index $\Delta_2$ is negative.

11. The optical waveguide fiber of claim 1 in which each of the segments of the core region comprises a refractive index profile selected from the group consisting of a step, an $\alpha$-profile, a rounded step, and a trapezoid.

12. The optical waveguide fiber of claim 1 in which the radius $r_0$ is in the range of about 0.05 $\mu$m to 3 $\mu$m, and the first annular segment adjacent the central void comprises a rounded step profile having a center radius $r_1$, measured from the centerline to the geometrical center of the annular segment, in the range of about 2 $\mu$m to 5 $\mu$m, a width $w_1$, measured at the half maximum relative index points of the first annular segment, in the range of about 0.5 $\mu$m to 5.0 $\mu$m, and a relative index, $\Delta_1\%$, in the range of about 0.4% to 1.1%.

13. The optical waveguide fiber of claim 1 in which the radius $r_0$, is in the range of about 0.05 $\mu$m to 3 $\mu$m, and the first annular segment adjacent the central void has an $\alpha$-profile having an $\alpha$ of about 1, and an outer radius, $r_1$, in the range of about 4 $\mu$m to 8 $\mu$m and a relative index, $\Delta_1\%$, in the range of about 0.7% to 1.1%.

14. The optical waveguide fiber of claim 13 further including a second annular segment having a step index profile and a relative index, $\Delta_2\%$, in the range of about 0 to 0.2%, and an outer radius, $r_2$, in the range of about 7 $\mu$m to 9 $\mu$m.

15. The optical waveguide fiber of claim 14 further comprising a third annular segment surrounding the second annular segment, the third annular segment having a rounded step index profile having a center radius, $r_3$, in the range of about 7.5 μm to 10.5 μm, a width in the range of about 1.0 μm to 2.5 μm, and a relative index, $\Delta_3\%$, in the range of about 0.2% to 0.4%.

16. The optical waveguide fiber of claim 13 further comprising a second annular segment having a step index profile and a radius, $r_2$, in the range of about 8 μm to 10 μm and a relative index, $\Delta_2\%$, which is negative.

17. The optical waveguide fiber of claim 16 in which $\Delta_2\%$ is in the range of about 0 to −0.3%.

18. The optical waveguide fiber of claim 17 further comprising a third annular segment having a rounded step index profile and a center radius, $r_3$, in the range of about 9 μm to 11 μm, a width in the range of about 1.5 μm to 3 μm, and a relative index, $\Delta_3\%$, in the range of about 0.2% to 0.4%.

19. The optical waveguide fiber of claim 1 in which the radius $r_0$ is in the range of about 0.05 μm to 3 μm, and the first annular segment has an α-profile wherein α is about 1, and an outside radius, $r_1$, in the range of about 4 μm to 6.5 μm and a relative index, $\Delta_1\%$, in the range of about 0.9% to 1.1%.

20. The optical waveguide fiber of claim 19 further comprising a second annular segment having a step index profile and a relative index, $\Delta_2\%$, in the range of about 0 to 0.2%, and an outer radius, $r_2$, in the range of about 7 μm to 9 μm.

21. The optical waveguide fiber of claim 20 further comprising a third annular segment having a rounded step profile and a center radius, $r_3$, in the range of about 7.5 μm to 9 μm, a width in the range of about 1.0 μm to 2.5 μm, and a relative index, $\Delta_3\%$, in the range of about 0.2% to 0.4%.

22. The single mode optical waveguide fiber of claim 1 wherein the core region further comprises second and third annular segments, wherein the annular segments are layered one upon another, wherein the central void and the first, second and third annular segments have respective relative refractive indexes, $\Delta_0$, $\Delta_1$, $\Delta_2$, and $\Delta_3$, and wherein $\Delta_1 > \Delta_3 > \Delta_2 > \Delta_0$.

23. An optical waveguide fiber comprising:

a core glass region having a centerline, a radius, the radius being selected to provide a single mode optical waveguide fiber, and at least a first annular layer which forms the boundary of a void along the centerline, the annular layer having a refractive index profile, and, a clad glass layer, surrounding and in contact with the core region surface, and, having a refractive index profile;

wherein the single mode waveguide has a total dispersion slope less than about 0.08 ps/nm$^2$-km, an induced attenuation under lateral load less than about 0.8 dB/m, and an effective area no less than about 70 μm$^2$.

24. An optical waveguide fiber comprising:

a core region having a centerline, a radius, and including a first annular segment surrounding the centerline, the first annular segment having an inner radius, radius $r_0$, defining a central void, the central void and the first annular segment each having a refractive index profile, a radius, and a relative index $\Delta\%$, and a clad glass layer, surrounding and in contact with the core region, having a refractive index profile and a minimum relative index $\Delta\%$ of zero;

wherein the radii, the refractive index profiles, and the relative indexes of the core region are selected to provide a total dispersion slope less than about 0.08 ps/nm$^2$-km over a wavelength range of about 1500 nm to 1600 nm.

* * * * *